Figure 1:
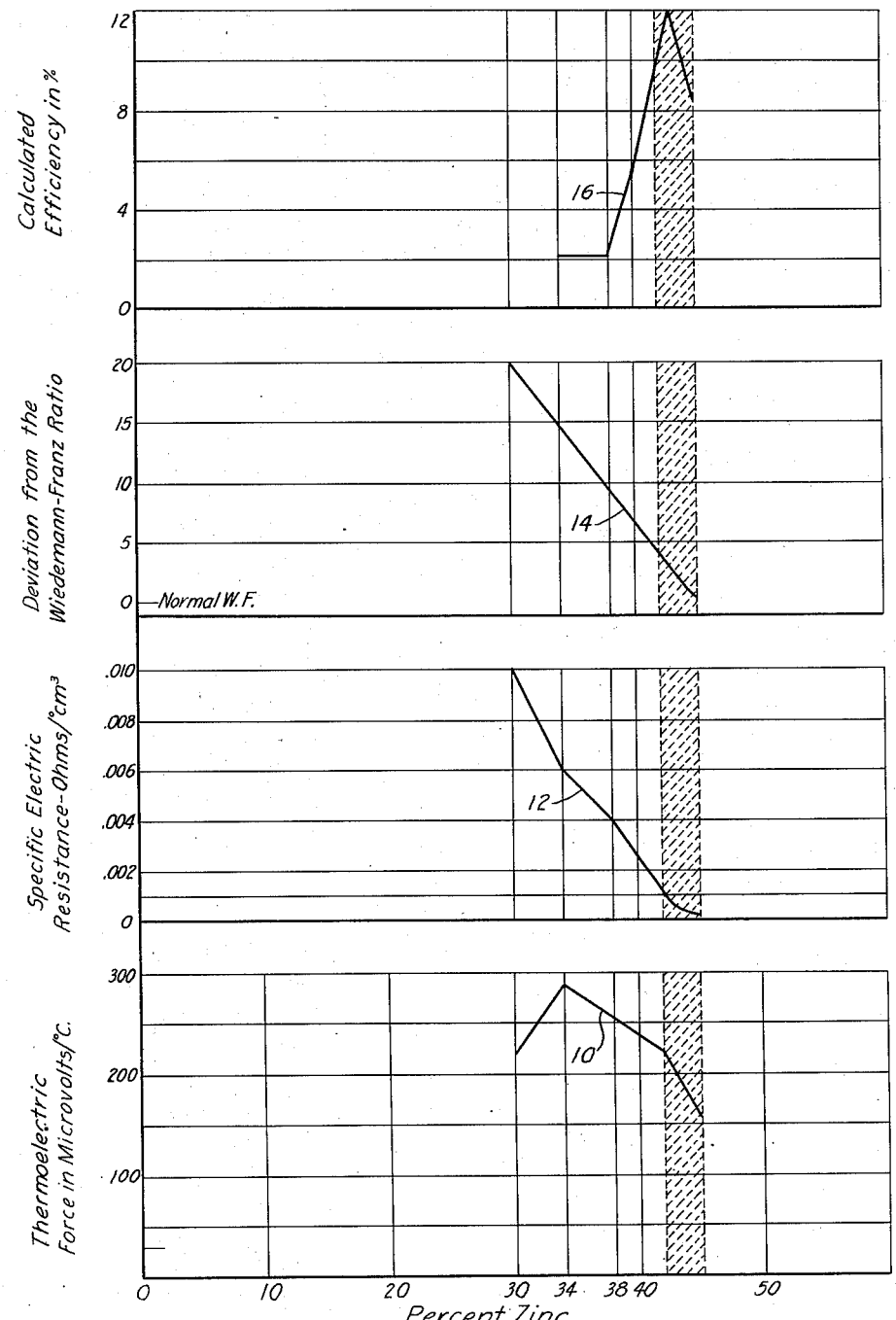

Jan. 21, 1941.  M. TELKES  2,229,482
THERMOELECTRIC COUPLE
Filed March 31, 1939   2 Sheets-Sheet 1

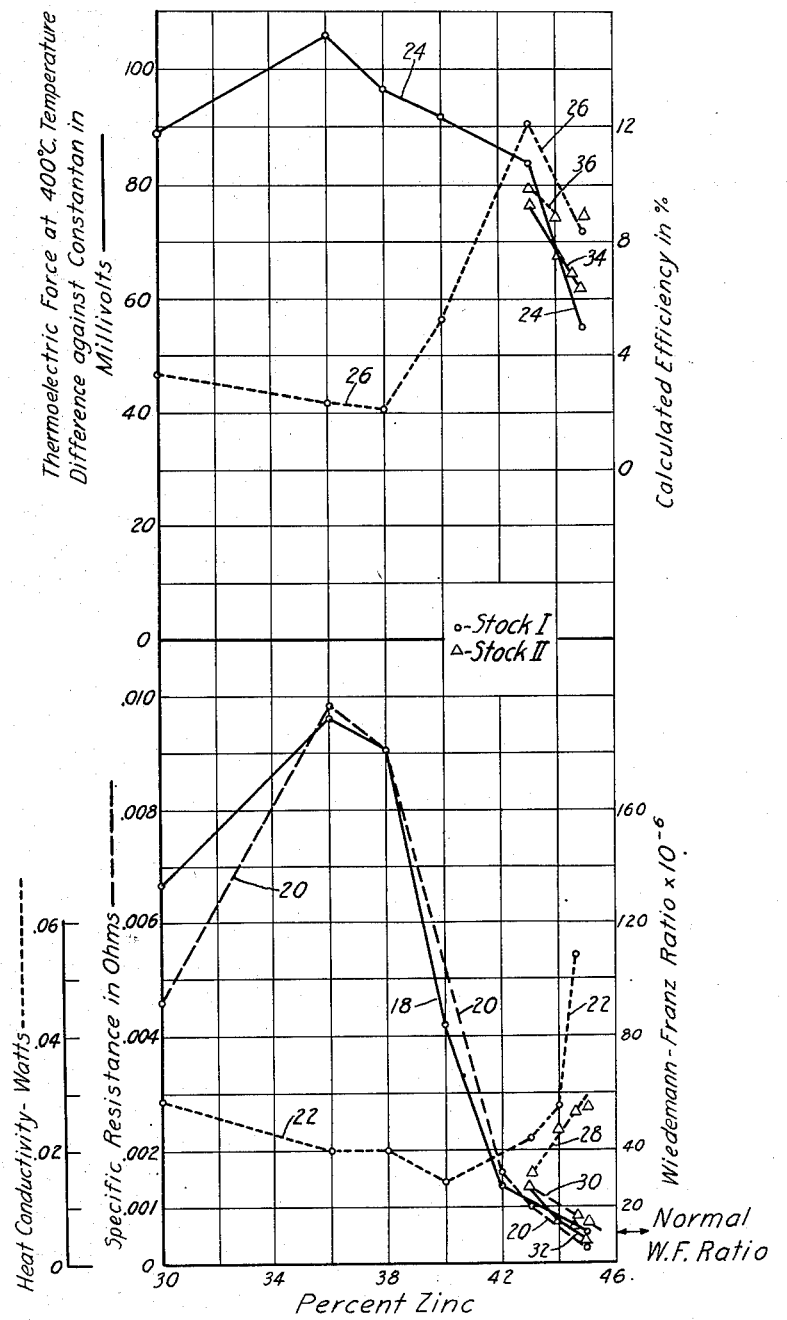

Patented Jan. 21, 1941

2,229,482

UNITED STATES PATENT OFFICE 2,229,482

THERMOELECTRIC COUPLE

Maria Telkes, Edgewood, Pa., assignor to Westinghouse Electric & Manufacturing Company, East Pittsburgh, Pa., a corporation of Pennsylvania Application March 31, 1939, Serial No. 265,199

4 Claims. (Cl. 136—5)

This invention relates generally to apparatus for the conversion of thermal energy to electrical energy and particularly to an element suitable for use in thermocouples and to thermocouples embodying the element.

This application is a continuation-in-part of my prior application Serial No. 102,491, filed September 25, 1936, and which is directed to thermoelectric couples.

Prior attempts to use thermoelectric couples for the transformation of thermal energy and particularly solar radiation into electrical energy have proven to be impractical, principally because of their low efficiency or the lower ratio of electrical energy output obtained to the input of thermal energy when both are expressed in the same physical units. Heretofore it has generally been considered that in order to secure the highest efficiency from a thermocouple, the thermocouple should be composed of elements formed of metals or alloys which have very high thermoelectromotive force.

Among the different thermocouples produced heretofore, alloys formed from zinc and antimony have been employed as the positive element of the thermocouple but have not been satisfactory because of the low efficiencies obtained. These elements generally contained up to 40% of zinc with the balance substantially all antimony, it not being considered desirable to employ elements having higher concentrations of zinc because of the lower thermo electromotive force of the alloy. In isolated cases, it has been reported that zinc antimony elements containing about 50% of zinc have been formed, but that they were unsatisfactory because of their low efficiency generally attributed to the low thermoelectromotive force of the alloy.

An object of this invention is to provide a thermocouple element which is highly efficient in the conversion of thermal energy into electrical energy.

Another object of this invention is to provide a thermocouple element formed from zinc and antimony in predetermined proportions which is highly efficient in the conversion of thermal energy to electrical energy.

A more specific object of this invention is the provision of a thermocouple having a positive element formed from zinc and antimony in predetermined proportions and including, where desired, a small proportion of an alloying element suitable for facilitating forming operations, the thermocouple being highly efficient for the conversion of thermal energy to electrical energy.

Other objects of this invention will become apparent from the following description when taken in conjunction with the accompanying drawings, in which:

Figure 1 is a graph, the curves of which are representative of thermoelectric force, specific electric resistance, deviation from the Wiedemann-Franz ratio and efficiency obtained from thermocouple elements of different zinc and antimony contents, and Fig. 2 is a graph, the curves of which are representative of specific resistance, heat conductivity, Wiedemann-Franz ratio, thermoelectric force and the efficiency obtained for different zinc-antimony elements and as used against constantan at a 400° C. temperature difference.

In forming the thermocouple element of this invention, zinc and antimony in predetermined proportions are utilized. The thermocouple element comprises from 42% to 45% by weight of zinc and from 58% to 55% by weight of antimony, this particular combination giving an element which is highly efficient as will be explained more fully hereinafter when the element formed therefrom is employed as the positive element of the thermocouples.

In preparing the positive thermoelectric element of this invention, the metals, zinc and antimony, in the predetermined proportions can be consolidated in any suitable manner. As an example of one of the different modes of forming the elements, the zinc and antimony metals are reduced in any suitable manner to the form of fine granules and are homogeneously mixed in the proper proportions in a ball mill, or by other well known methods. This mixture of zinc and antimony powders is then packed into a mold, preferably of graphite and which may be preheated where desired, the mold being of the predetermined shape and size of the desired element. Sufficient heat is applied to the zinc and antimony powders in the mold to effect a fusion of the powders into a solid block. In this form, it is found that a portion of the zinc content, thought to be that portion above the atomic weight of zinc which alloys with the antimony, is present in the solid element in the form of a substantially uniform dispersion throughout the element.

Another way of forming the zinc-antimony element of this invention is to melt the zinc and antimony in amounts sufficient to give an element having a zinc content of from 42% to 45% and to pour the molten alloy directly into a mold preferably of graphite having a cavity of the desired shape and size of the element. In casting the element, it is sometimes found to be difficult to strip the cast element from the mold.

In order to facilitate the casting and stripping procedure, up to 2% of aluminum or other suitable metal is added to the base melt of zinc and antimony with the zinc and antimony present in the proportions of 42% to 45% of zinc and 58% to 55% of antimony. By employing aluminum in combination with the zinc and antimony, it is found that the aluminum functions somewhat as a deoxidizer and also prevents the cooled casting from sticking to the mold. An examination of these cast elements also reveals that a portion of the zinc has not combined with the antimony of the element, but instead is present in the alloy as a substantially uniform dispersion similar to that found in the element formed by fusing the zinc and antimony powders as described hereinbefore.

With the elements fromed from 42% to 45% of zinc and from 58% to 55% of antimony, it is found by measurement that, as compared with known positive elements of zinc and antimony having a zinc content of up to 40%, the specific electrical resistance, and the thermoelectric force of the elements of this invention is somewhat lowered while the heat conductance is increased slightly. As is well known, most metals have a ratio or constant based on the specific electric resistance and the specific heat conductivity, as measured in ohms and watts per centimeter cube respectively at 273° absolute temperature of about $6.8 \times 10^{-6}$ or about $7.8 \times 10^{-6}$ at room temperature of 27° C. This constant is known as the normal Wiedemann-Franz ratio.

In producing the elements of this invention and applying them in thermocouples, it has been found that the efficiency of a thermocouple may be considered proportional to the square of the thermoelectric force expressed in volts per degree centigrade provided the product of the specific electric resistance and the specific heat conductivity per centimeter cube are expressed in ohms and watts and remain substantially a constant.

In order to illustrate the different measured and calculated values found in the zinc-antimony elements, and to particularly point out the unexpected results obtained with the elements of this invention having a zinc content of from 42% to 45%, reference may be had to Fig. 1 of the drawings, in which the abscissa of the graph is representative of the zinc content of the different elements and the ordinates reading progressively upwardly are representative of thermoelectric force in microvolts per degree centigrade, specific electric resistance in ohms per degree centimeter cube, the deviation of the Wiedemann-Franz ratio from the normal and the efficiency obtained from the elements as shown by curves 10, 12, 14 and 16 respectively. As indicated in Fig. 1 of the drawings, the results given are those obtained on zinc-antimony elements containing from 30% up to 45% of zinc, the specific resistance, thermoelectric force and Wiedemann-Franz ratio being measured and the efficiency being calculated. The exact measurement of the Wiedemann-Franz ratio does not appear in this figure, but instead there is shown the deviation of each of the alloying elements from the normal Wiedemann-Franz ratio of $7.8 \times 10^{-6}$ obtained at room temperature for most alloys. It is to be noted that the alloying element containing 30% of zinc has a comparatively low thermoelectric force, a very high specific electric resistance, and that its deviation from the normal Wiedemann-Franz ratio is about 20 times.

As the zinc concentration in the thermocouple element is increased, it is noted that the thermoelectric force first increases with a concentration of about 34% zinc and then decreases up to and through the maximum of 45% zinc. At the same time the specific electric resistance of the thermocouple elements is materially decreased as the thermoelectric force decreases until the elements containing 42% to 45% zinc have an extremely low specific electric resistance ranging below .0016 ohm per centimeter cube. It is to be noted that as the specific resistance and thermoelectric force decreases, the deviation from the normal Wiedemann-Franz ratio also materially decreases approaching the value of the normal Wiedemann-Franz ratio.

Referring to the curve 16 of Fig. 1, it is to be noted that the highest efficiency is obtained with the zinc-antimony elements having a zinc concentration of between 42% and 45%, or, namely, where the Wiedemann-Franz ratio of the elements does not deviate more than 5 times from the normal Wiedemann-Franz ratio, as shown by curve 14. Thus, it is apparent that high efficiencies are obtained with zinc-antimony elements where the thermoelectric force per degree centigrade is substantially lowered, it apparently being a prerequisite that the deviation from the normal Wiedemann-Franz ratio be not more than 5 fold. Such a small deviation is obtained by utilizing an alloy having a very small specific electric resistance without too much regard as to its having an extremely high thermoelectric force.

As specific examples of some of the elements formed which embody this invention and for comparison with known thermocouple elements, reference may be had to the following table in which a number of elements are disclosed containing from 30% up to 45% of zinc and from 70% to 54.5% of antimony with a small percentage of aluminum in certain of them.

*Table I*

| Alloy No. | Composition, percent | | | WF ratio×10⁻⁶ | Spec. res. ohm per cm. | Spec. heat watts | Thermoelectric force, microvolts/°C. | Eff., percent |
|---|---|---|---|---|---|---|---|---|
| | Zn | Sb | Al | | | | | |
| 3555a | 30 | 70 | | 132 | .0046 | .029 | 225 | 3.4 |
| 3558a | 36 | 64 | | 193 | .0098 | .020 | 265 | 3.3 |
| 3559a | 38 | 62 | | 181 | .0091 | .020 | 246 | 3.1 |
| 3560d | 40 | 60 | | 84 | .0059 | .014 | 230 | 5.3 |
| 3520b | 43 | 56.5 | 0.5 | 20.5 | .00093 | .022 | 210 | 12.3 |
| 3521c | 45 | 54.5 | 0.5 | 11.9 | .00035 | .144 | 144 | 8.3 |

Referring to Table I, it is seen that the Wiedemann-Franz ratio, specific resistance, specific heat, thermoelectric force and efficiency of the different thermoelectric elements are given and by referring to Fig. 2 of the drawings, the variation in these values as shown by curves 18, 20, 22, 24 and 26 respectively for the different thermocouple elements containing different concentrations of zinc including the 42% to 45% range of zinc as embodied in the thermocouple element of this invention, are apparent. From the drawings, it is quite evident that those thermocouple elements having a zinc concentration of from 42% to 45% are the most efficient of the elements referred to in the table.

In measuring the Wiedemann-Franz ratio, as given in Table I, the method of Jaeger and Diesslhorst (Wiss. Abh. Phys. Techn. Reichsanst. 3, 269–424, 1900) is employed, the elements being fastened to two cooling chambers kept at a constant temperature and a current is passed through the element producing an electrical gradient and a temperature gradient therein. Three small holes are drilled in the element, two near the ends and one at the center perpendicular to the length of the element into which temperature measuring thermocouples are fastened and the whole bar is surrounded with electrical insulation. An alternating current is employed in order to establish an equilibrium in the element and the temperature is measured during the heating while the voltage drop in the element is being measured. Numerous tests were made, the results agreeing within 1 to 2% of each other.

As explained hereinbefore, through the development of the thermocouple element of this invention it has been found that the efficiency of a thermocouple may be considered proportional to the square of the thermoelectromotive force expressed in volts per degree centigrade provided the product of the specific electric resistance and the specific heat conductivity remains substantially a constant. Without going into the derivation of the formula for the calculation of the efficiency of a thermocouple, the following formula is given, it being understood that this does not give the exact efficiency but gives an approximate efficiency within a very close figure to the actual efficiency which can be measured.

$$\text{Efficiency} = \frac{1}{1 + \frac{4(h'r' + h''r'')}{e^2 T}}$$

In the formula given, the expression $h'r'$ is the Wiedemann-Franz ratio of the thermocouple element employed as a negative element and the expression $h''r''$ is the Wiedemann-Franz ratio for the zinc-antimony element under test while $e$ is the thermoelectric force between the elements and $T$ represents the temperature difference between the temperature of the hot junction and that of the cold junction in aboslute degrees. In the results given in Table I, constantan, which has a Wiedemann-Franz ratio of about $11 \times 10^{-6}$, is employed as the negative element. This formula represents the total conversion of thermal energy into electrical energy. However, since the conditions in a thermocouple or thermopile are analogous to those in galvanic cells, and the maximum energy to be derived from a thermopile in an external circuit is obtained when the external or load resistance is equal to the internal resistance of the thermopile, then the useful efficiency is only half of the total conversion of energy or one-half of the efficiency calculated by employing the above given formula and only half of the efficiency recorded in Table I. In actual experiments, the useful efficiency obtained from thermocouples embodying the elements having a zinc concentration of 42% to 45% as disclosed hereinbefore, is about half of that efficiency given in Table I.

By way of further examples of the efficiencies obtained by employing zinc-antimony elements containing from 42% to 45% of zinc in accordance with this invention, reference may be had to the following table, these elements being made from a different antimony stock than those elements identified hereinbefore in Table I.

Table II

| Alloy No. | Composition, percent | | | WF ratio×10⁻⁶ | Spec. res. ohm per cm. | Spec. heat watts | Thermoelectric force, microvolts/°C. | Eff., percent |
|---|---|---|---|---|---|---|---|---|
| | Zn | Sb | Al | | | | | |
| 3593 | 43 | 56.5 | 0.5 | 27.7 | .00171 | .016 | 205 | 9.8 |
| 3585 | 44 | 55.5 | 0.5 | 19.6 | .00086 | .024 | 172 | 8.8 |
| 3572B | 44.5 | 55.0 | 0.5 | 20.1 | .00078 | .026 | 164 | 8.0 |
| 3574 | 45 | 54.5 | 0.5 | 14.2 | .00052 | .027 | 156 | 8.8 |

The results obtained with the thermocouple elements given in Table II are also plotted in Fig. 2 of the drawings as indicated thereon, by the marks. In Fig. 2, curves 28, 30, 32, 34 and 36 represent the specific heat, specific resistance, Wiedemann-Franz ratio or constant, thermoelectric force and efficiency respectively. The same methods of measuring the Wiedemann-Franz ratio, specific resistance, specific heat, thermoelectric force and efficiencies are employed as were employed in obtaining the results given in Table I, the difference in results being occasioned by the use of different commercial stock of antimony. These results also verify that a material having a very high thermoelectric force is not always necessary in obtaining the maximum efficiency from a thermocouple, but that instead the maximum efficiencies are obtained where the Wiedemann-Franz ratio of the alloys approaches the normal Wiedemann-Franz ratio for most metals, it being necessary that the alloys employed have a low specific resistance without too much regard to the heat conductivity obtained in the element.

The thermocouple elements of this invention containing from 42% to 45% of zinc, and from 58% to 55% of antimony with the possible inclusion of slight amounts of aluminum can be employed in many different forms as the positive element of a thermocouple or in thermopiles. In the results given hereinbefore, the thermocouple element of this invention was employed against constantan at a temperature difference of 400° C., but it is, of course, to be understood that similar and comparable results can be obtained where other negative elements are employed in the thermocouple. Thermocouples embodying the positive element formed from the zinc-antimony alloy containing 42% to 45% of zinc may readily be connected in series and can readily be employed for the conversion of thermal energy into electrical energy and are particularly adapted for use in solar engines, especially if means, known to the art, are provided for concentrating the heat on the hot junction of the thermocouple.

This thermocouple element will find many and varied uses in the industry, and although the invention is described with reference to a particular embodiment thereof, it is, of course, not to be limited thereto except insofar as is necessitated by the prior art and the scope of the appended claims.

I claim as my invention:
1. A thermocouple element comprising from 42% to 44% of zinc and from 58% to 56% of antimony.
2. A thermocouple element comprising from 42% to 44% of zinc and from 58% to 56% of antimony, a portion of the zinc being present in the form of a substantially uniform dispersion in the element.
3. A thermocouple having a negative element consisting of a copper-nickel alloy and a positive element comprising from 42% to 44% of zinc and from 58% to 56% of antimony.
4. A thermocouple element comprising approximately 43% of zinc and the balance substantially all antimony.

MARIA TELKES.